United States Patent [19]

Sochor

[11] Patent Number: 4,547,816
[45] Date of Patent: Oct. 15, 1985

[54] METHOD OF RECORDING DIGITAL AUDIO AND VIDEO SIGNALS IN THE SAME TRACK

[75] Inventor: Josef Sochor, Dieburg, Fed. Rep. of Germany

[73] Assignee: Robert Bosch GmbH, Stuttgart, Fed. Rep. of Germany

[21] Appl. No.: 374,196

[22] Filed: May 3, 1982

[51] Int. Cl.⁴ ............................................. H04N 5/782
[52] U.S. Cl. ...................................... 360/19.1; 360/32; 358/343
[58] Field of Search ...................... 360/19.1, 32, 8, 9.1; 358/343

[56] References Cited

U.S. PATENT DOCUMENTS 4,295,154 10/1981 Hata et al. ........................... 360/19.1
4,303,950 12/1981 Taniguchi ........................... 360/19.1
4,353,098 10/1982 Heinz et al. ......................... 360/19.1

*Primary Examiner*—Robert L. Richardson
*Attorney, Agent, or Firm*—Frishauf, Holtz, Goodman & Woodward

[57] ABSTRACT

The magnitude of time-compression of audio signals recorded following the recording of video signals in the end portion of the same oblique track on magnetic tape is so related to the bit rate of recording of the video signals, in the recording of digital signals encoded in binary transmission codes, that the minimum interval between successive level changes in the audio signals is greater than the minimum interval between successive level changes in the video signal. This has the advantage of reducing the error rate in the audio signals in order to facilitate processing of digital signals of the audio information and of the video information in common processing channels, the minimum interval between successive level changes in the digital audio signals is made an integral multiple, preferably the double, of the minimum interval between successive level changes in the video signals. It is also advantageous to use different binary transmission codes for audio and video signals, particularly with respect to whether or not a level transition is permitted in the middle of a bit cell. Preferably the digital audio signals are recorded in a transmission code in which level changes are permitted in the middle of a bit cell, and the digital video signals are recorded in a transmission code in which level changes are not permitted in the middle of a bit cell.

5 Claims, 7 Drawing Figures

METHOD OF RECORDING DIGITAL AUDIO AND VIDEO SIGNALS IN THE SAME TRACK

This invention concerns recording of digitally coded television signals on a magnetic tape, particularly on a succession of tracks running obliquely across the tape on which picture and sound signals, hereinafter referred to as video and audio signals, respectively, are alternately recorded.

Recording of this kind is disclosed in German published patent application No. (OS) 29 21 892. In such systems, recording of the video and audio information components can be contained on the same oblique track, preferably in separate blocks or segments of the track respectively for audio and video information. The known process accordingly has the advantage that the audio signals pertaining to the color television signal that is recorded can in principle be recorded in the same manner and can likewise be picked up from the magnetic tape in the same manner as the video signals. As a result, essentially the same processing channels can be brought into play for picture and sound signals.

In the operation of the recording method described in the above-identified reference, it has been found that a compromise must be found between the obtainable recording density and the permissible error rate. In principle, it is in fact possible to compress the audio signals in such a way that their recording density is exactly as great as that of the video signals. The single bit rate consequently appearing in recording and reproduction facilitates the optimization of the circuits provided for recording and/or playback, but it nevertheless leads to a uniform error rate. In the case of data signals representing the video information errors are compensated for by continuously running error suppression processing. Since, however, the human ear is more sensitive to sudden fluctuations in loudness and pitch than the eye is for picture errors, very much more expensive methods of error correction, or error concealing, are needed for the sound part of the television signal. The smaller information content appearing in the audio part of the television signal in comparison to the video signals permits a smaller compression of the audio signals, so that in this manner in principle their error rates can be drastically reduced. Since the degree of compression of the audio signals has only a slight effect on the tape consumption, the compression of the audio signals can be carried out without regard to the video signals. With smaller compression, the error rate in the audio portion becomes smaller and the suppression of errors easier. In this case, however, there is the disadvantage that the common use of the same processing channel for picture and sound signals becomes more difficult, since on account of the then greater differences in bit rates the participating circuits can be optimized only with difficulty.

SUMMARY OF THE INVENTION

It is an object of the present invention to provide a method of recording and records obtainable thereby which facilitate the common use of processing channels to a significant extent, while making it possible to reduce the error rate in the processing of audio signals sufficiently to take account of the greater sensitivity of the listener-viewer to the results of errors in the digital transmission of audio signals.

Briefly, the time-compression of the audio signal is so correlated to the bit rate of the video signals that the minimum wavelength of the recorded digitally coded audio signals is greater than the minimum wavelength of the recorded digitally coded video signals. Since in the case of recorded digital signals the minimum wavelength is related to the minimum spacing between successive changes in signal level, this means that with reference to the digitally coded signals, as and when they are being recorded, the minimum possible time interval between two successive level changes in the audio signal must be larger than the minimum possible time interval between two successive level changes in the video signal. Moreover, for the objective of processing of both video and audio signals in a certain number of common stages, it is important for the aforesaid minimum possible time interval in the audio signals to be an integral multiple of the aforesaid minimum possible time interval for the video signals, and it is particularly convenient to have the ratio be 2:1.

This method and such records have the advantage that the average error rate in the recording of digitally coded audio signals is substantially lower than that of the digitally coded video signals. There is the further advantage that the expense and complication of error correction in the audio part of the equipment can be kept low. Still another advantage is that the processing channels for video and audio signals can, to a large extent, be used in common. It is particularly fortunate that these advantages can be enjoyed simultaneously. In a preferred kind of recording, the respective binary codes of the audio and video digital signals in the transmission channels to which the recording or pickup heads are connected are different binary codes, the transmission channel binary code of the audio signal being preferably one in which a level change of the signal is permissible in the middle of a bit cell, and the transmission channel binary code of the video signals is one in which no level change of the signal is permissible in the middle of a bit cell, although it is also possible to use in reverse the same distinction between the transmission codes of the audio and video signals.

In the case of digital signals, it is common to identify bit intervals or "cells" by reference to clocking signals derived from the bit rate which can be synchronized with the signals being processed in various known ways.

The criteria of the invention in terms of the minimum time intervals between successive level changes in a serial bit stream correspond in the case of the tape recording to minimum spacing between successively recorded changes in the level of the recorded signal.

THE DRAWING

The invention is further described by way of illustrative embodiment with reference to the annexed drawings, in which.

DESCRIPTION OF THE ILLUSTRATED EMBODIMENTS

Figure 1:
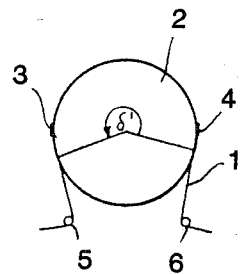
FIG. 1 is a simplified diagram of the portion of a tape-recorder-reproducer, of the television signal type, in which the tape is advanced around a rotary headwheel.

FIG. 1 shows the tape path of the magnetic tape 1 around a guiding cylinder 2 that may be either fixed or rotating. In a transverse bore of the guiding cylinder 2, there rotates a headwheel equipped on it periphery with two magnetic heads 3 and 4 that are located diammetrically opposite each other on the headwheel. The angle of envelopment by the tape is so chosen that over a part of the track length the magnetic heads both lie against the magnetic tape 1 and can transfer information to or from the tape. Guiding rollers 5 and 6 guide the magnetic tape in such a way that during uniform tape movement, the information from the magnetic heads 3 and 4 is, during recording, recorded in a series of parallel track sections on the tape that are oriented obliquely to the tape edge. When two channels are used as further described herein, two diammetral pairs of magnetic heads may be similarly set on the same headwheel, relatively disposed, for example, as shown in the copending U.S. patent application of Winfried Horstmann, Serial No. filed Mar. 30, 1982, assigned to the assignee of this application.

Figure 2:
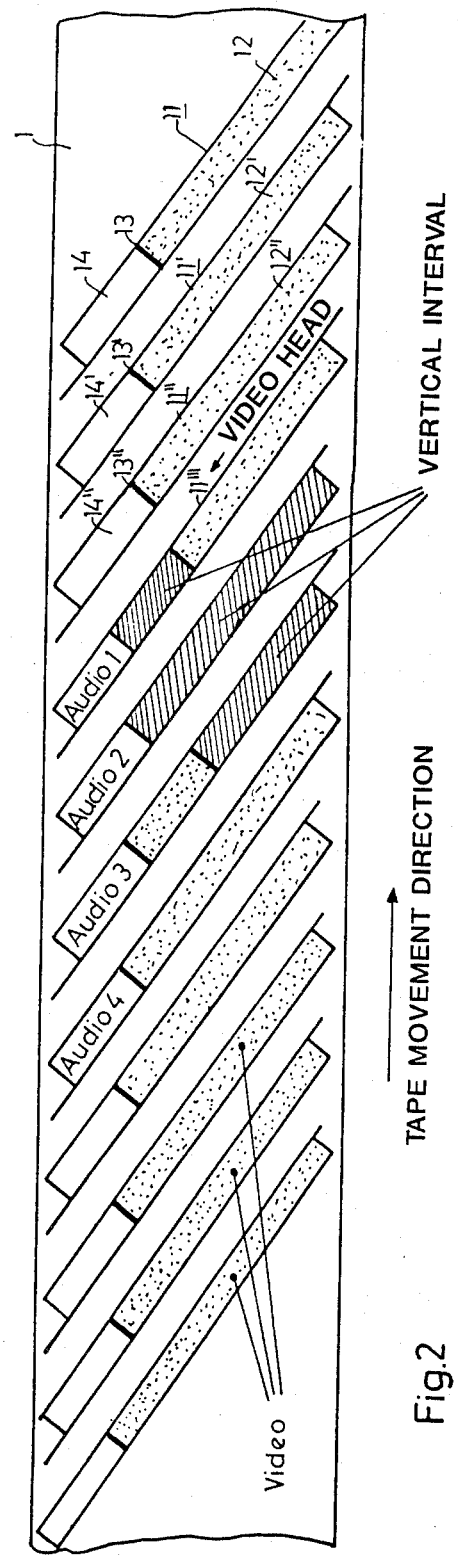
FIG. 2 is a track diagram of oblique tracks recorded on magnetic video tape in accordance with the invention.

In the track pattern illustrated in FIG. 2, parallel oblique track sections 11, 11', 11'', etc., are recorded on the magnetic tape 1. A part of the track sections contains, on parts 12, 12', 12'' and so on of their respective lengths, video information recorded in digital form, and each of these is separated by a short information-free piece 13, 13', 13'', etc., respectively from succeeding parts 14, 14', 14'', etc., of the various tracks on which audio information is recorded, likewise in digital form.

The digitally stored audio information at the end of a track is recorded or read out following, in time, the video information. It belongs, with respect to its content, to the video information and must be made available again in parallel to the video information at the time of reproduction.

Figure 3:
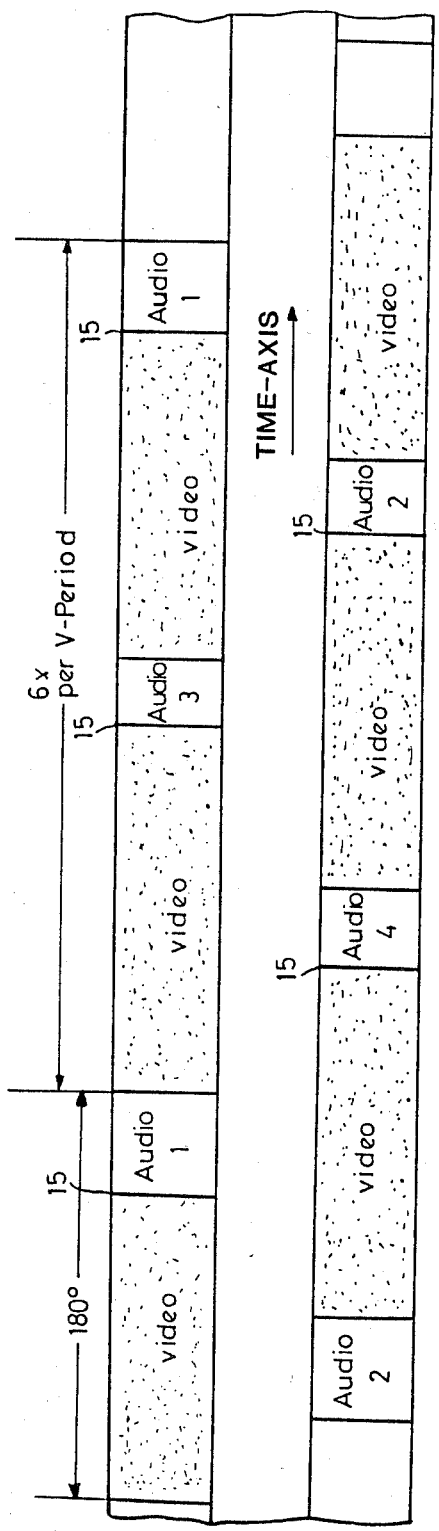
FIG. 3 is a time diagram relating to tracks of FIG. 2.

FIG. 3 shows the time course pattern and the manner in which, with the selected information transfer configuration, audio information is recorded in digital form in each case at the end of a track, while simultaneously on the following track the recording of video information in digitally coded form has already begun. The storage of video information consisting of the content of several television lines and immediately thereafter the sound information belonging thereto, thus requires the same lapse of time during which one magnetic head at the periphery of the headwheel remains in contact with the magnetic tape.

The audio information for this purpose is time-compressed and delayed, in such a way that while maintaining a prescribed spacing, it follows right on after the digitally recorded video information. Since the audio information in its time-compressed form takes up only a fraction of the storage space required by the corresponding video information, it is possible at the end of a first track to record audio information of a first channel, at the end of the second track that of a second channel and at the end of the third track the information of a third transmission channel.

The space for providing the sound following the video track is obtained either by increasing the envelopment angle of the magnetic tape around the transducer equipment (FIG. 1) to permit the sound information to be recorded in the prolongation of the video track in time-compressed and delayed form, or else by subjecting the video information also to time-compression and making the space thus set free in the video track for recording the likewise time-compressed sound information.

Figure 4:
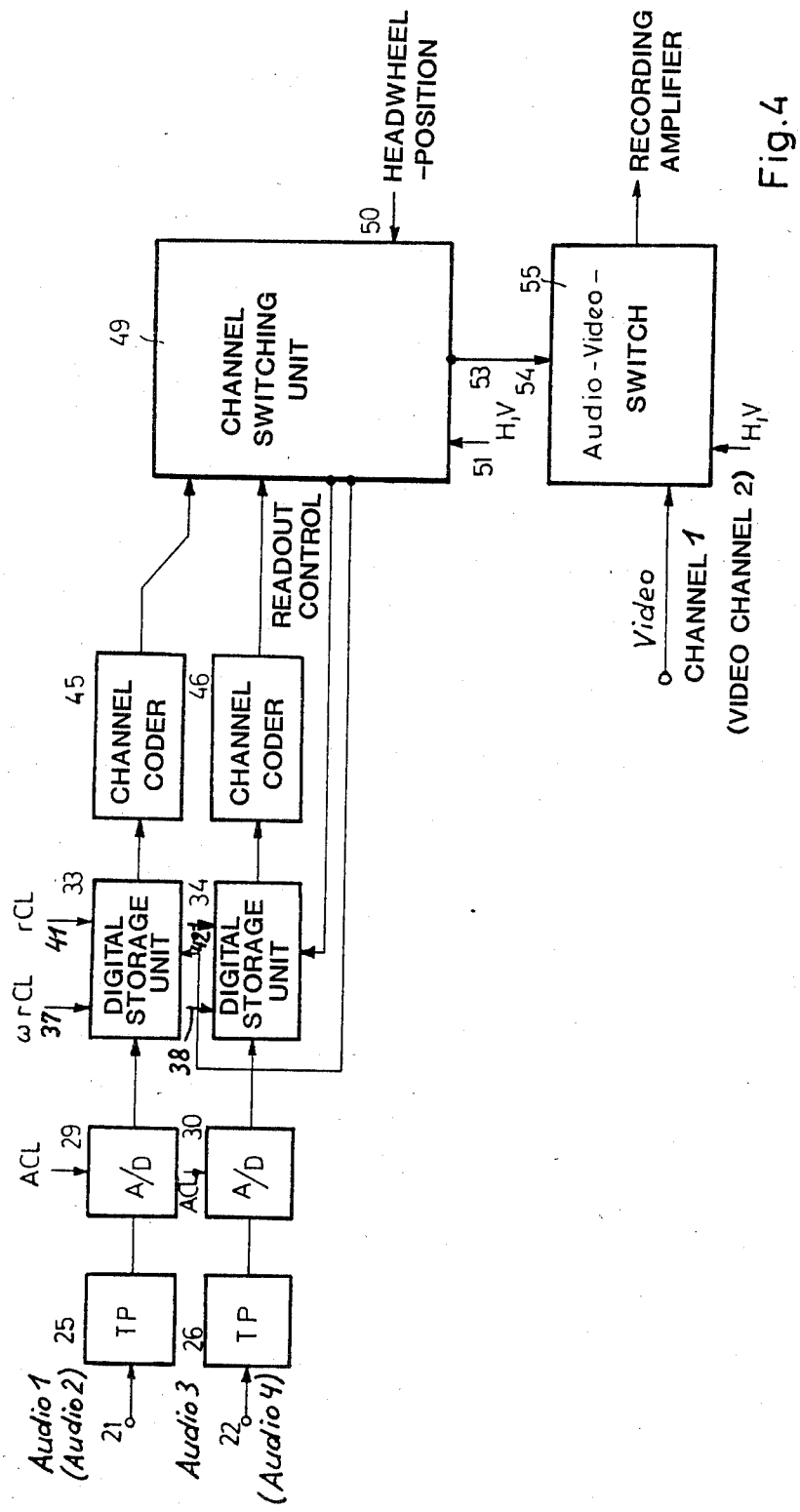
FIG. 4 is a block circuit diagram of a system for operation in accordance with the invention.

FIG. 4 is a block diagram of a recording system. Two sound channels independent of each other are supplied respectively to the inputs 21 and 22. After passage in each case through a low-pass filter 25, 26, in which the high-frequency disturbing components are filtered out, the information proceeds to the analog-to-digital converters 29 and 30. Here they are quantized from the analog form into a 16-bit data format. The 16-bit quantized information is then passed on from the A/D converters to the digital storage units 33 and 34. These digital stores respectively have clocking inputs 37 and 38 for writing in information and also clocking inputs 41, 42 for reading out. By the use of suitable clocking rates, the information is subjected to time-compression when it is read out, and for convenience the audio information is converted from 16-bit format into an 8+8-bit format for conformity with the video channel which operates with an 8-bit format.

The respective outputs of the digital stores are connected with the inputs of the channel coders which convert the 8+8-bit format into a channel code. The outputs of these coders proceed to the channel-switching unit 49 for selection of the information from one of the audio channels for recording on each track end. The supplying of this information takes place independently of the position of the headwheel, which position is recognized by a headwheel position detector not shown in the drawing and provided further to the input 50 of the channel switch. The switching-over of the individual audio channels is, moreover, carried out in a manner dependent upon the occurrence of the horizontal and vertical synchronization signals which are provided through an input 51 for control of the channel switch 49. The audio input 54 of the audio-video switch 55 is connected to the output 53 of the channel switch 49. When video information is simultaneously recorded in each track with video content, the switchover from video to audio is performed in the audio-video switch. FIG. 4 shows the provision of video input at the left and of horizontal and vertical synchronization pulses at the bottom and the output provided to the recording amplifier at the right for the audio-video switch 55. The choice of code to be provided in accordance with the invention in the channel coders 45 and 46 now remains to be explained.

Figure 5:
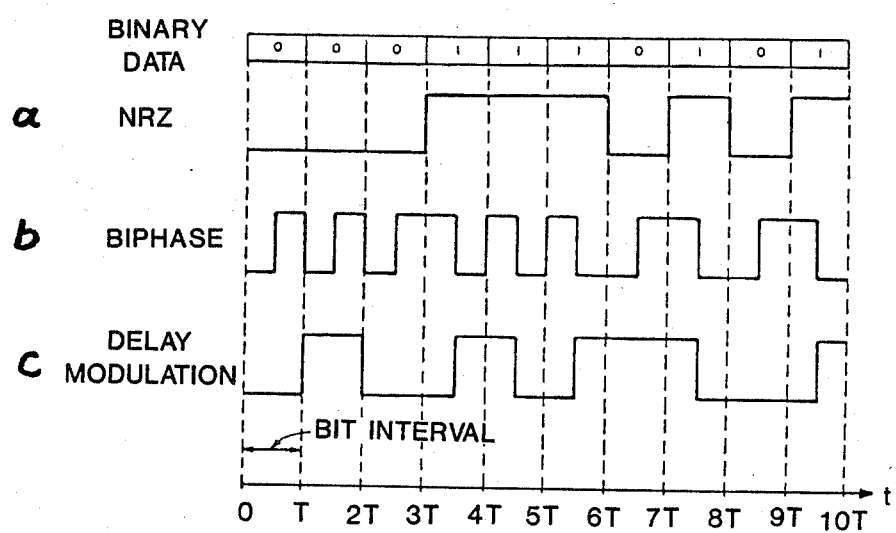
FIG. 5 is a diagram comparing different ways of encoding the same binary data.

In the Table of FIG. 5, there is shown at the top a succession of data bits having the values 0001110101, which extends over 10-bit intervals, each of the length T, and below that representation of the information in binary code there are shown in three lines a, b and c of the table three different ways of encoding that binary information in a two-level electrical signal in accordance with various coding methods.

On line a of FIG. 5, encoding in the NRZ code is shown, which provides the smallest number of level changes within the data sequence given at the top of the table as an example. This code accordingly is outstandingly well-suited for obtaining high storage density, but it has the disadvantage of null point shifting as the result of the d.c. component when there is an unsymmetrical number of "O" and "I" bits in the data stream. Furthermore, when there is a succession of many O's or I's, the synchronization can be lost, which is to say that this code is not self-synchronizing.

On line b of FIG. 5, the information is shown in the so-called biphase code, which has the advantage of self-synchronization and freedom from d.c. components, at the cost of a substantially greater number of level changes. The storage density that can be obtained for a given channel bandwidth is accordingly much less than what can be obtained with the NRZ code.

A third type of encoding, called "delay modulation" is shown in line c of FIG. 5. In this case self-synchronization is obtained by providing a level change in the middle of the bit cell (i.e. in the middle of the bit interval T) and also providing that a level change will take place at the boundary between successive "O" bits. The d.c. component is not equal to zero, but smaller than when the NRZ code is used. The density of level changes is less than in the code of line b but higher than in the NRZ code of line a.

In addition to the codes illustrated in FIG. 5 by way of example, a considerable number and variety of other codes exists which have different transmission properties. The codes of FIG. 5 and others that could provide further examples may be divided into codes in which there are no transitions in the bit cells, such as the NRZ code, and codes in which there are some transitions that occur in the middle of the bit cells, as is the case both for the biphase code and the delay modulation code.

From the description of FIG. 5, it is evident that by the various possible choices of a digital code a prescribed data sequence can be transmitted with varying degrees of success, as measured with reference to various transmission criteria. The selection should therefore be made with careful taking account of the transmission properties of the transmission channel which is to be used. Thus, if the transmission of d.c. components produces difficulties, a code without d.c. component or with only slight d.c. voltage components should be chosen.

Figure 6:
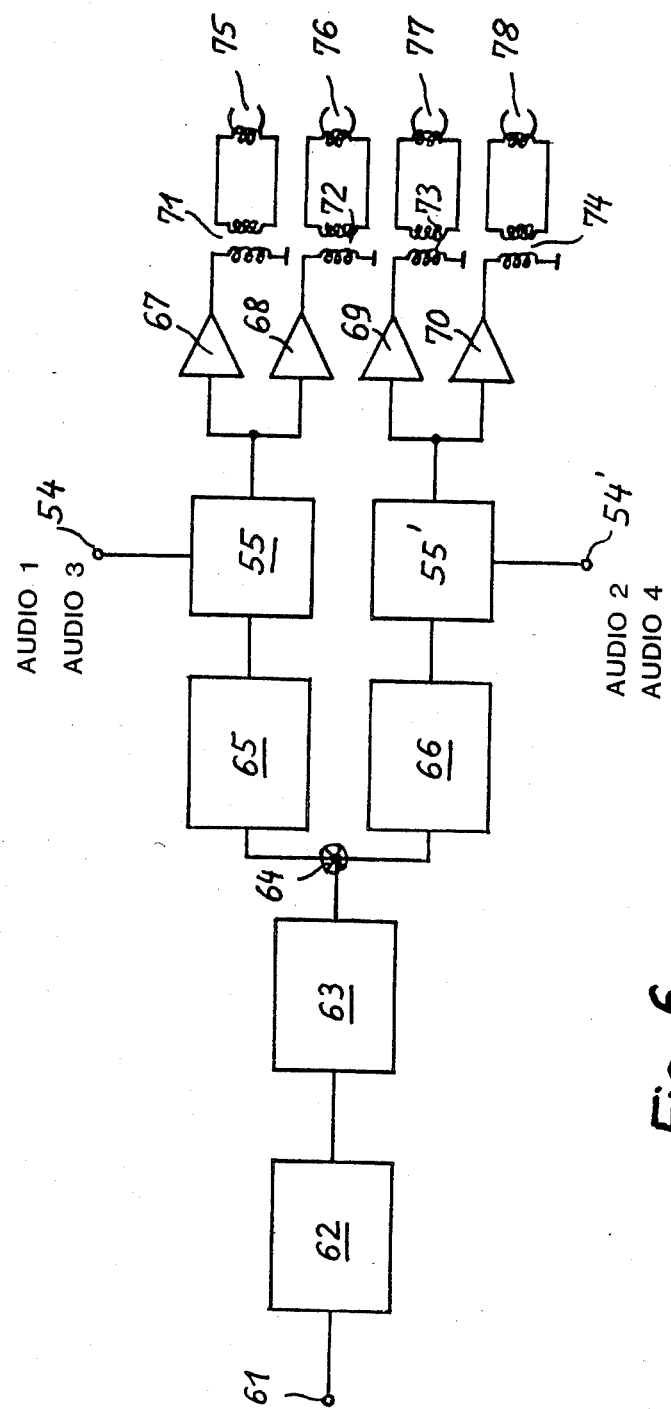
FIG. 6 is a block circuit diagram of apparatus for recording differently coded data on magnetic tape.

FIG. 6 shows a recording circuit according to the invention suited for transmitting different signal portions with different coding. In this embodiment, the signal at the input 61, which may for example be in 8-bit parallel form and have a bit rate of 192M-bit per second, is first put into a buffer store 62 in which the sequence of successive 8-bit words is modified according to a particular distribution pattern so that longer signal drop-outs will produce no correlation disturbances known as "shuffling". This type of rearrangement in buffer storage is well-known and does not need to be further described here and, moreover, although desirable, is not essential for the practice of the present invention. The output of the buffer storage 62 is then supplied to the code converter 63 in which the signals are converted from an 8-bit code into signals of a 10-bit code in which so-called "parity" bits are added to make error detection possible.

In the schematically illustrated circuit 64, information signals in 10-bit parallel form are distributed between two channels designated 1 and 2. Conversion of the information into serial form then takes place in the parallel-to-series converters 66 and 65 which then supply the serial data streams respectively to the video inputs of the respective audio-video switchover circuits 55 and 55', to which audio channel inputs are provided respectively at the audio inputs 54 and 54', in each case from an audio channel switch circuit 49, as shown in FIG. 4 for a single audio-video switch 55. In other words, FIG. 4 shows a system for supplying audio channels 1 and 3 for interleaving with video channel 1 in switch 55 with an indication, by means of parenthetical labels regarding audio 2, audio 4 and video channel 2, that the same circuit can be used for providing audio channels 2 and 4 in suitable fashion for interleaving them with video channel 2 for recording.

The combined signals from the audio-video switch 55 of FIG. 6 are supplied in parallel to the two amplifiers 67 and 68 of the first channel, the outputs of which are transferred by transformers 71 and 72, respectively, to the magnetic heads 75 and 76 for recording. In the same way, the combined signals of the second channel are supplied by the audio-video switch 55' in parallel to the amplifiers 69 and 70, the outputs of which respectively go through transformers 73 and 76 to the magnetic heads 77 and 78 for recording.

Figure 7:
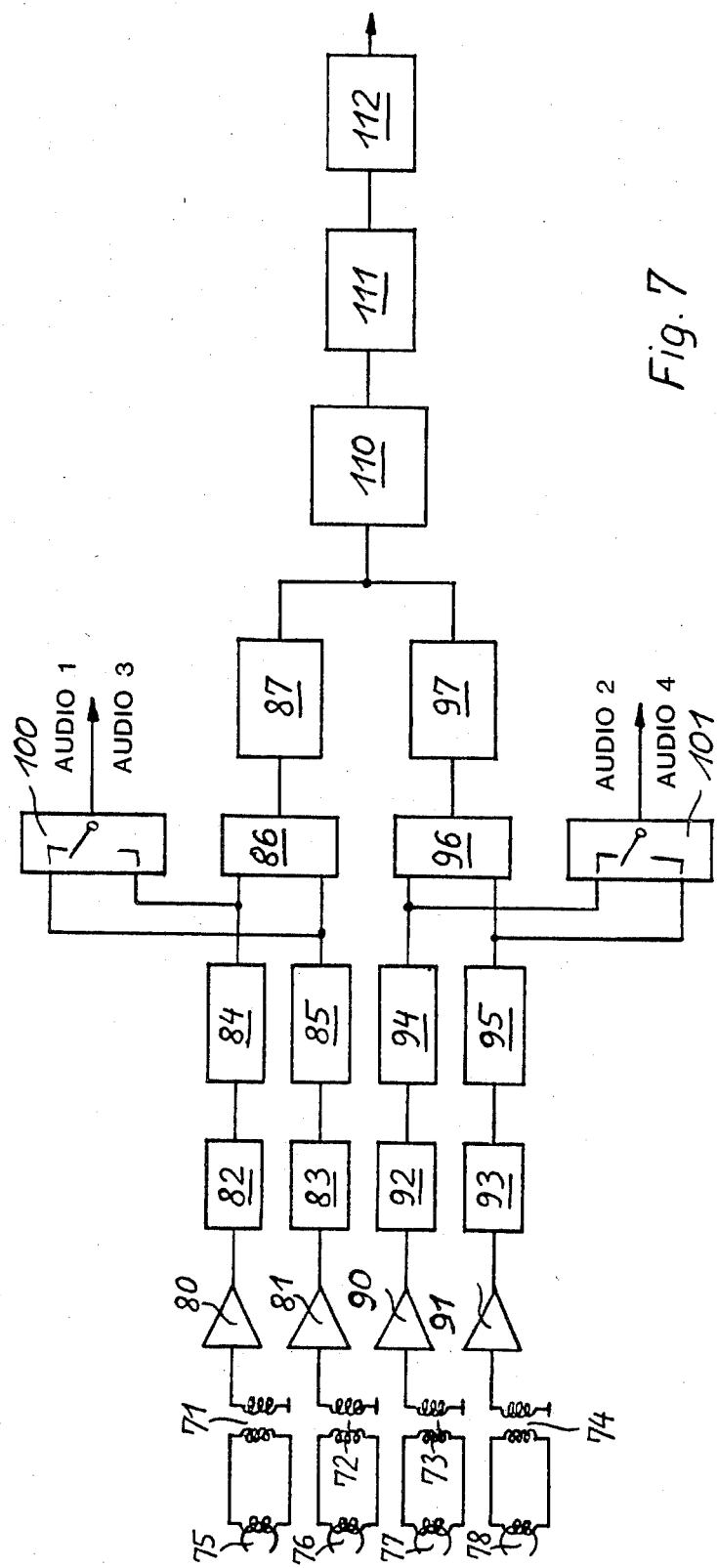
FIG. 7 is a circuit block diagram of a system for reproducing previously recorded data differently encoded in accordance with the invention.

FIG. 7 is a diagram of the corresponding system for reproducing television signals from a tape on which they are recorded. Signals picked up by the magnetic heads 75 and 76 of channel 1 are amplified in the pick-up amplifiers 80 and 81, equalized or otherwise corrected by the equalizing or correcting networks 82 and 83, and processed in the synchronizing signal regenerators 84 and 85. Then the audio signals of both signals streams are separated from the combined signals and put together into a continuous data stream in the multiplexer 100. The switch unit 86 then combines the video signals alternately supplied by the two video heads 75 and 76 belonging to channel 1 into a single stream of signals, by switching through the path to the particular head that is in contact with the video portion of a track on the tape at the particular time. The serial bit stream from the output of the switch 86 is supplied to the serial-to-parallel converter 87, at the output of which a 10-bit parallel signal is provided which has a bit rate of 100 M-bit per second.

In the same way, the signals of the magnetic heads 77 and 78 of reproduction channel 2 are amplified respectively in the pick-up amplifiers 90 and 91, equalized in the networks 92 and 93, and processed for regenerating the synchronizing singals in circuits 94 and 95. Then the audio signals of the two branches are separated rom the video signals and put together into a continuous audio signal by the multiplexer 101. The switch 96 alternately picks up the video signals from the magnetic heads 77 and 78 and puts them together for supply to the serial-to-parallel converter 97, the output of which provides a data stream with a bit rate of 100 M-bit per second. The two 10-bit parallel data streams at the outputs of the converters 87 and 97 are then put together with an acceptance rate that is twice as high as the offering rate of the individual channels, in this case therefore, 200 M-bit/second, and then converted in the channel decoder 110 which also contains the error recognition circuit. From there the signal goes to the storage unit 111 where the redistribution of the information bits conversely to the operation of unit 62 of FIG. 6 is produced so that the succession of the 8-bit words in original form is reconstituted. Finally, in the circuit unit 112 the errors detected in the reproduced data stream by the error detection circuit are corrected or concealed so that at the output 63 there is made available for further processing a digital color television signal which is to a great extent free of transmission errors.

The circuits of FIGS. 6 and 7 make possible the handling of audio signals encoded, as shown in circuits 45 and 46 of FIG. 4, in a manner different from the encoding of the digital video signal provided to the input 61 of FIG. 6, in accordance with the criteria described in the summary of the invention.

Although the invention has been described with reference to particular illustrative embodiments, it will be understood that modifications and variations are possible within the inventive concept.

I claim:

1. Method of recording digitally coded television signals, including audio signals and video signals, on magnetic tape, in which at least the audio signals are time-compressed before recording, and which the audio and video signals are recorded in alternation on the same track, further comprising method steps of:

digitally encoding the audio signals and also the video signals of composite television signals to produce digital audio and video signals, each digital signal comprising a predetermined number of binary bits distinguished at any moment by one of two binary signal levels, each bit being assigned in the case of serial transmission, a bit cell which is a unit interval of which a plurality thereof constitute the serial transmission interval of a digital signal representing a sample of an audio or a video signal;

processing said digital audio and video signals, after encoding and before recording, with time-compression of the digital audio signals relative to the digital video signals, followed by serializing the digital signals and sequencing successions of digital video signals and successions of digital audio signals, said relative time-compression being such that the minimum frequency cycle period of the serialized digitally coded audio signals is greater than the minimum frequency cycle period of the serialized digitally coded video signals, the relative number of bits per encoded sample and the type of binary code of the audio and video signals and the relative time-compression of the digital audio signals with respect to the digital video signals being such that in the serialized digitally coded signals, the minimum possible time interval between two successive changes between binary signal levels in the serialized digital audio signal, is an integral multiple of the minimum possible time interval between two successive changes between binary signal levels in the serialized digital video signal, and recording said serialized and sequenced digital signals.

2. Method as defined in claim 1, in which said encoding of signals is so performed that different transmission channel binary codes are used respectively for the furnishing of audio and video signals to the same recording heads for recording said audio and video signals.

3. Method as defined in claim 2, in which said audio signals are encoded into a transmission channel binary code in which a level change of the signal is permissable in the middle of a bit cell and signifies a logic value change only when it occurs in the middle of a bit cell, and said video signals are encoded into a transmission channel binary code in which no level change of the signal is permissible in the middle of a bit cell.

4. Method as defined in claim 3, in which the minimum possible time interval between two successive level changes in an audio signal in said serialized digital signals is twice the minimum possible time interval between two successive level changes in a video signal in said serialized digital signals.

5. Method as defined in claim 2, in which the encoding step is performed in respective binary codes for the audio and video signals, wherein the number of bits per sample is straighter for the digital audio signals than for the digital video signals.

* * * * *